(12) United States Patent
Fukuda

(10) Patent No.: US 10,915,801 B2
(45) Date of Patent: Feb. 9, 2021

(54) PORTABLE ELECTRONIC DEVICE, NON-CONTACT COMMUNICATION SYSTEM, AND NON-CONTACT COMMUNICATION METHOD

(71) Applicants: Kabushiki Kaisha Toshiba, Minato-ku (JP); Toshiba Infrastructure Systems & Solutions Corporation, Kawasaki (JP)

(72) Inventor: Aki Fukuda, Yokohama (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/806,034

(22) Filed: Mar. 2, 2020

(65) Prior Publication Data

US 2020/0202189 A1 Jun. 25, 2020

Related U.S. Application Data

(63) Continuation of application No. PCT/JP2018/033209, filed on Sep. 7, 2018.

(30) Foreign Application Priority Data

Sep. 8, 2017 (JP) .................. 2017-173130

(51) Int. Cl.
*G08B 21/00* (2006.01)
*G06K 19/04* (2006.01)
(Continued)

(52) U.S. Cl.
CPC ....... *G06K 19/045* (2013.01); *G06K 7/10217* (2013.01); *G06K 7/10297* (2013.01); *G06K 19/0723* (2013.01)

(58) Field of Classification Search
CPC ............ G06K 19/045; G06K 19/0723; G06K 7/10217; G06K 7/10247; H04B 5/0031; G04W 4/80; G06Q 20/3226
See application file for complete search history.

(56) References Cited

U.S. PATENT DOCUMENTS

| | | | |
|---|---|---|---|
| 9,141,781 B2* | 9/2015 | Akita | H04W 12/06 |
| 2008/0300020 A1* | 12/2008 | Nishizawa | H04W 12/06 455/558 |
| 2009/0303015 A1 | 12/2009 | Teruyama et al. | |

FOREIGN PATENT DOCUMENTS

| | | |
|---|---|---|
| JP | 2000-115183 A | 4/2000 |
| JP | 2009-294821 A | 12/2009 |

(Continued)

OTHER PUBLICATIONS

International Search Report dated Nov. 20, 2018 in PCT/JP2018/033209 filed Sep. 7, 2018, (with English Translation), 3 pages.

(Continued)

*Primary Examiner* — Toan N Pham
(74) *Attorney, Agent, or Firm* — Oblon, McClelland, Maier & Neustadt, L.L.P.

(57) ABSTRACT

A portable electronic device of an embodiment includes a plurality of secure elements and a communicator. The communicator performs communication with a reader/writer device to which an external device is connected using non-contact communication. The communicator changes a transmission destination to a secure element corresponding to a transmission destination identifier for identifying the transmission destination among the plurality of secure elements on the basis of the transmission destination identifier and change-instruction-information giving instructions to change the transmission destination, assigned to telegraph data received from the reader/writer device using the non- (Continued)

contact communication and transmits the telegraph data received from the reader/writer device to the secure element.

7 Claims, 8 Drawing Sheets

(51) Int. Cl.
*G06K 7/10* (2006.01)
*G06K 19/07* (2006.01)

(56) References Cited

FOREIGN PATENT DOCUMENTS

| | | |
|---|---|---|
| JP | 2011-527035 A | 10/2011 |
| JP | 2012-27667 A | 2/2012 |
| JP | 2016-535902 A | 11/2016 |
| WO | WO 2009/156880 A1 | 12/2009 |
| WO | WO 2015/028824 A1 | 3/2015 |

OTHER PUBLICATIONS

"Cards and Security devices for personal identification—Contactless proximity objects—Part 4: Transmission protocol," International Standard ISO/IEC 14443-4, 2018, 62 pages.

* cited by examiner

| SE NAME | NODE ADDRESS |
|---------|--------------|
| SE_0    | 0            |
| SE_1    | 1            |
| SE_2    | 2            |
| ...     | ...          |

| EXTERNAL DEVICE NAME | NODE ADDRESS |
|----------------------|--------------|
| EXTERNAL DEVICE A    | 4            |
| EXTERNAL DEVICE B    | 5            |
| EXTERNAL DEVICE C    | 6            |
| ...                  | ...          |

PORTABLE ELECTRONIC DEVICE, NON-CONTACT COMMUNICATION SYSTEM, AND NON-CONTACT COMMUNICATION METHOD

TECHNICAL FIELD

Embodiments of the invention relate to a portable electronic device, a non-contact communication system, and a non-contact communication method.

BACKGROUND ART

In recent years, there have been widely used electronic devices such as integrated circuit (IC) cards or mobile phones which include secure elements (SEs) and communicate with an external device using non-contact communication method. In non-contact communication of such portable electronic devices, the state of an operating environment such as a power level or an operating frequency is notified using a card identifier (CID). However, in conventional portable electronic devices, when a plurality of SEs are included, there is no means for switching between SEs, and it may not be possible to communicate with an external device appropriately using non-contact communication.

CITATION LIST

Patent Literature

[Patent Literature 1] Japanese Patent Application Publication No. 2012-27667

SUMMARY OF INVENTION

Technical Problem

An object to be solved by the present invention is to provide a portable electronic device, a non-contact communication system, and a non-contact communication method capable of performing communication appropriately in order to be able to handle a plurality of secure elements.

Solution to Problem

A portable electronic device of an embodiment includes a plurality of secure elements and a communicator. The communicator performs communication with a reader/writer device to which an external device is connected using non-contact communication. The communicator changes a transmission destination to a secure element corresponding to a transmission destination identifier for identifying the transmission destination among the plurality of secure elements on the basis of the transmission destination identifier and change-instruction-information giving instructions to change the transmission destination, assigned to telegraph data received from the reader/writer device using the non-contact communication and transmits the telegraph data received from the reader/writer device to the secure element.

DESCRIPTION OF EMBODIMENTS

Hereinafter, a portable electronic device, a non-contact communication system, and a non-contact communication method according to an embodiment will be described with reference to the drawings.

First Embodiment

Figure 1:
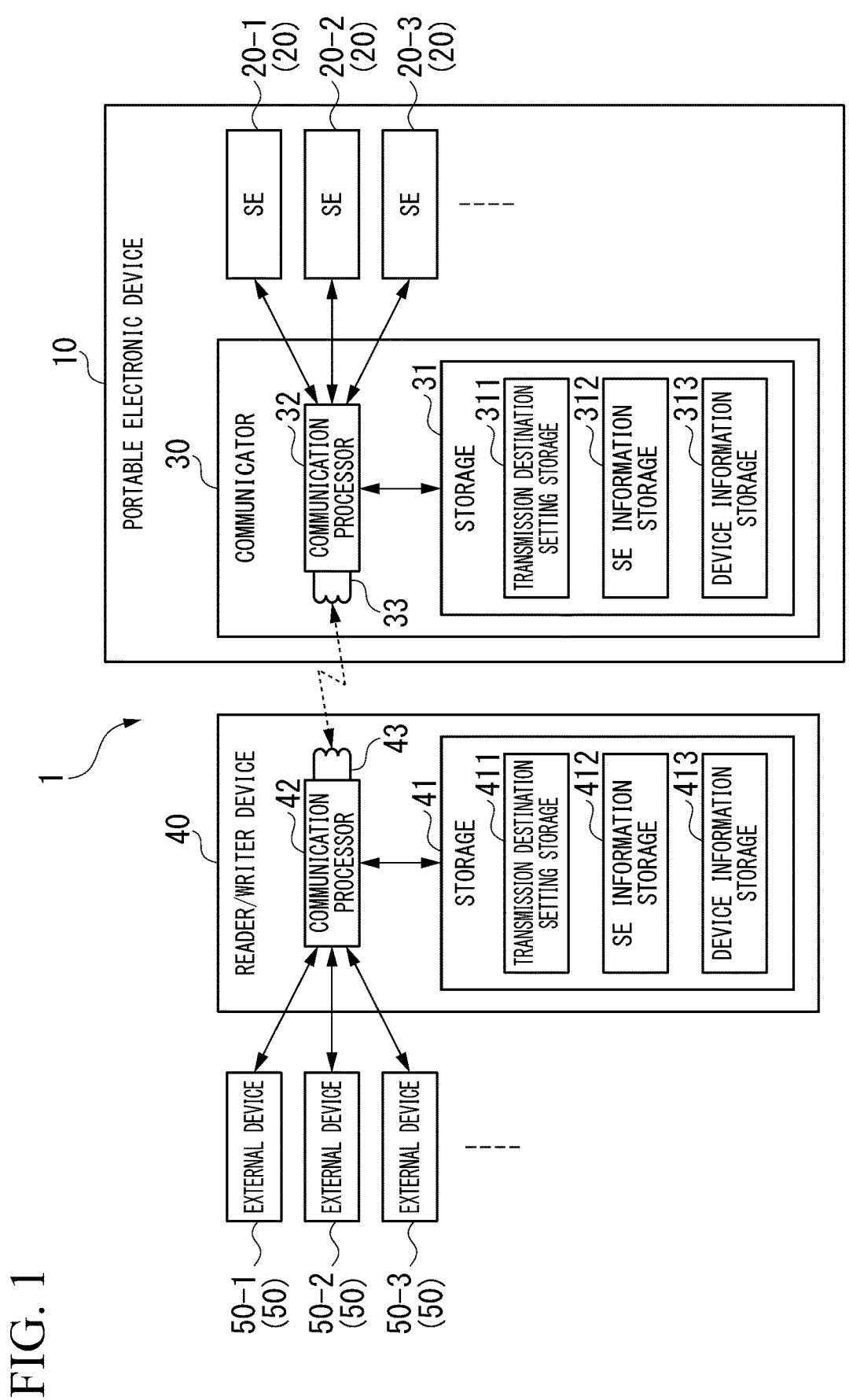
FIG. 1 is a block diagram illustrating an example of a non-contact communication system according to a first embodiment.

FIG. 1 is a block diagram illustrating an example of a non-contact communication system 1 according to a first embodiment.

As illustrated in FIG. 1, the non-contact communication system 1 includes a portable electronic device 10, a reader/writer device 40, and external devices (50-1, 50-2, 50-3, and the like).

The external devices 50-1, 50-2, 50-3, and the like have the same configuration, and in the following description, will be referred to simply as an external device 50 when they are an external device included in the non-contact communication system 1 or when these devices are not distinguished.

The portable electronic device 10 is a portable terminal such as a smartphone, for example, and includes secure elements (SEs) (20-1, 20-2, 20-3, and the like) and a communicator 30. The portable electronic device 10 communicates with the reader/writer device 40 using proximity non-contact communication. Here, a non-contact communication protocol is a non-contact IC card protocol or a near field radio communication (NFC) protocol, for example.

SEs 20-1, 20-2, 20-3, and the like have the same configuration, and in the following description, will be referred to simply as an SE 20 when they are an SE included in the portable electronic device 10 or when these devices are not distinguished.

The SE 20 is a security module that stores secret information for using various applications and guarantees security in hardware and software and is, for example, a subscriber identity module (SIM) card. In this case of a SIM card, the SE 20 is a module having an IC chip in which an IC card system operating system (OS) is mounted. The details of the hardware that forms the SE 20 will be described later.

The SE 20 performs data communication related to applications with the external device 50 via the communicator 30 and the reader/writer device 40. The SE 20 executes a process (a command process) corresponding to a command (a process request) received from the communicator 30. The SE 20 transmits a response (a process response) which is an execution result of the command process to a device controller 12.

Here, the details of the hardware that forms the SE 20 according to the present embodiment will be described.

Figures 2, 3, 4:
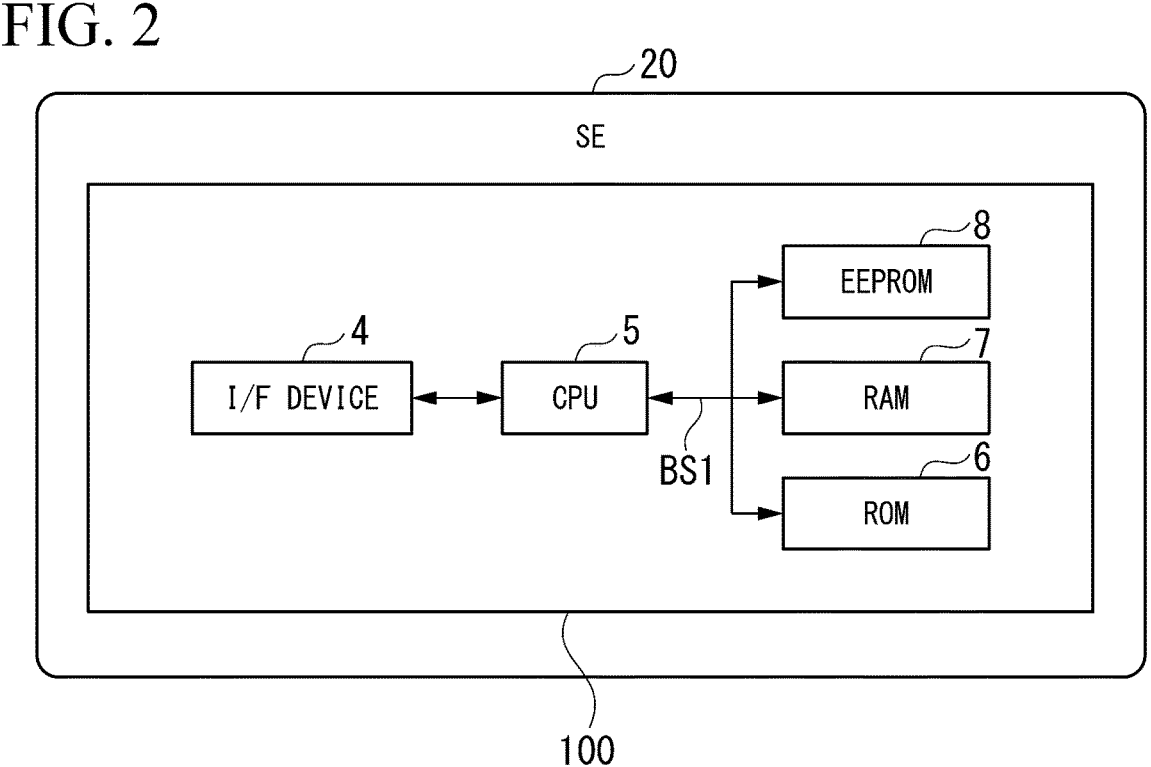
FIG. 2 is a block diagram illustrating a hardware configuration example of an SE according to the first embodiment.
FIG. 3 is a diagram illustrating an example of data stored in an SE information storage according to the first embodiment.
FIG. 4 is a diagram illustrating an example of data stored in a device information storage according to the first embodiment.

FIG. 2 is a block diagram illustrating a hardware configuration example of the SE 20 according to the present embodiment. The example illustrated in FIG. 2 is a case where the SE 20 is a SIM card, and as illustrated in FIG. 2, the SE 20 includes an IC chip 100. The SE 20 is formed by mounting an IC module including the IC chip 100 on a plastic card base (an example of a card body). That is, the SE 20 includes an IC module including the IC chip 100 and a card base in which the IC module is embedded.

The IC chip 100 is a large scale integration (LSI) such as a one-chip microprocessor, for example. The IC chip 100 includes an interface (I/F) device 4, a central processing unit (CPU) 5, a read only memory (ROM) 6, a random access memory (RAM) 7, and an electrically erasable programmable ROM (EEPROM) 8. Moreover, the CPU 5, the ROM 6, the RAM 7, and the EEPROM (electrically erasable programmable ROM) 8 are connected by an internal bus BS1.

The I/F device 4 performs serial data communication with the communicator 30, for example. The I/F device 4 converts a received serial data signal to parallel data (for example, 1-byte data) and outputs the parallel data to the CPU 5. Moreover, the I/F device 4 converts data acquired from the CPU 5 to serial data and outputs the serial data to the communicator 30. The I/F device 4 receives commands from the communicator 30 and transmits responses to the communicator 30.

The CPU 5 executes a program stored in the ROM 6 or the EEPROM 8 to perform various processes of the SE 20. The CPU 5 executes a command process corresponding to a command received by the I/F device 4, for example.

The ROM 6 is a nonvolatile memory such as a mask ROM, for example, and stores a program for executing various processes of the SE 20 and data such as a command table.

The RAM 7 is a volatile memory such as a static RAM (SRAM), for example, and temporarily stores data used when performing various processes of the SE 20.

The EEPROM 8 is an electrically rewritable nonvolatile memory, for example. The EEPROM 8 stores various pieces of data used by the SE 20. The EEPROM 8 stores information used for various services (applications and security functions) which use the SE 20, for example.

Returning to description of FIG. 1, the communicator 30 communicates with the reader/writer device 40 to which the external device 50 is connected using non-contact communication. Moreover, the communicator 30 communicates with the SE 20 by transmitting the commands and receiving the responses to and from the SE 20. The communicator 30 transmits data (telegraph data) received from the reader/writer device 40 using non-contact communication to one of the plurality of SEs 20. Moreover, the communicator 30 changes a transmission destination to an SE 20 corresponding to a transmission destination identifier among the plurality of SEs 20 on the basis of the transmission destination identifier for identifying the transmission destination and change-instruction-information giving instructions to change the transmission destination, the transmission destination identifier and the change-instruction-information being assigned to the telegraph data received from the reader/writer device 40 using non-contact communication, for example. The communicator 30 transmits the telegraph data received from the reader/writer device 40 to the changed SE 20.

The communicator 30 includes a storage 31, a communication processor 32, and a coil 33.

The storage 31 stores various pieces of information used in communication performed by the communicator 30. The storage 31 includes a transmission destination setting storage 311, an SE information storage 312, and a device information storage 313.

The transmission destination setting storage 311 stores transmission destination setting information indicating one of the plurality of SEs 20 to which the data (telegraph data) received from the reader/writer device 40 will be transmitted. The transmission destination setting storage 311 stores a transmission destination identifier for identifying the SE 20, for example, as the transmission destination setting information. The transmission destination setting storage 311 stores "0", for example, as the transmission destination identifier (a node address) in an initial state (default), for example.

The SE information storage 312 (an example of a secure element information storage) stores identifiers corresponding to the SEs 20 included in the portable electronic device 10 (a host device) as SE list information (secure element list information). Here, the SE list information is SE construction data indicating the list of the SEs 20 included in the portable electronic device 10, for example. The SE information storage 312 stores the SE list information as illustrated in FIG. 3, for example.

FIG. 3 is a diagram illustrating an example of data stored in the SE information storage 312 according to the present embodiment. As illustrated in FIG. 3, the SE information storage 312 stores "SE name" and "node address" in correlation. Here, the "SE name" indicates the name of the SE 20 included in the portable electronic device 10, and the "node address" indicates the identifier of the SE 20 included in the portable electronic device 10.

In the example illustrated in FIG. 3, the "node address" corresponding to the "SE name" of "SE_0" is "0". The "SE_0" is selected in an initial state (default). Moreover, the "node address" corresponding to the "SE name" of "SE_1" is "1". In the present embodiment, it is assumed that "SE_0" corresponds to SE 20-1, "SE_1" corresponds to SE 20-2, and "SE_2" corresponds to SE 20-3, for example.

The device information storage 313 stores the device construction data received (acquired) from the reader/writer device 40. The device information storage 313 stores an identifier corresponding to the external device 50 that can be connected to the reader/writer device 40 as external device list information, for example. Here, the external device list information is device construction data indicating the list of the external devices 50 that can be connected to the reader/writer device 40, for example. As illustrated in FIG. 4, the device information storage 313 stores the external device list information, for example.

FIG. 4 is a diagram illustrating an example of data stored in the device information storage 313 according to the present embodiment. As illustrated in FIG. 4, the device information storage 313 stores "external device name" and "node address" in correlation. Here, the "external device name" indicates the name of the external device 50 that can be connected to the reader/writer device 40, and the "node address" indicates the identifier of the external device 50 that can be connected to the reader/writer device 40.

In the example illustrated in FIG. 4, the "external device name" indicates the name of the external device 50 that can be connected to the reader/writer device 40, and the "node address" corresponding to the "node address" of "external device A" is "4". The "external device A" is selected in an initial state (default). Moreover, the "node address" corresponding to the "external device name" of "external device B" is "5". In the present embodiment, it is assumed that "external device A" corresponds to the external device 50-1, "external device B" corresponds to the external device 50-2, and "external device C" corresponds to the external device 50-3, for example.

The communication processor 32 is a processor including a CPU and the like, for example, and controls the communicator 30. The communication processor 32 processes proximity non-contact communication with the reader/writer device 40 via the coil 33 to be described later. In an initial state, the communication processor 32 relays data communication between the external device 50-1 ("external device A") designated initially and the SE 20-1 ("SE_0") via the reader/writer device 40. In the initial state, the communication processor 32 stores "0" as a transmission destination identifier (node address) corresponding to the SE 20-1 ("SE_0"), for example, in the transmission destination setting storage 311.

The communication processor 32 transmits SE construction data (SE list information) stored in the SE information storage 312 to the reader/writer device 40. The communication processor 32 changes the transmission destination to an SE 20 corresponding to the transmission destination identifier among the plurality of SEs 20 on the basis of the transmission destination identifier and the change-instruction-information assigned to the telegraph data received from the reader/writer device 40 using non-contact communication and transmits the telegraph data received from the reader/writer device 40 to the SE 20.

Figure 5:
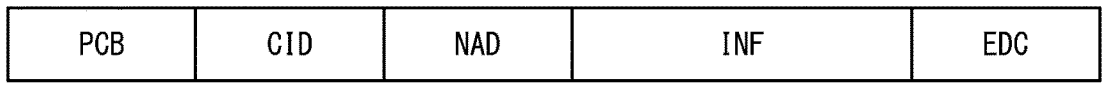
FIG. 5 is a diagram illustrating an example of a telegraph block of a non-contact communication protocol according to the first embodiment.

Here, the telegraph of the non-contact communication method between the reader/writer device 40 and the communicator 30 is transmitted and received via such a telegraph block as illustrated in FIG. 5, for example.

FIG. 5 is a diagram illustrating an example of a telegraph block of a non-contact communication protocol according to the present embodiment.

As illustrated in FIG. 5, a telegraph block includes a protocol control byte (PCB), a card identifier (CID), a node address (NAD), an information field (INF), and an error detection code (EDC). Here, the PCB (protocol control byte) is used for controlling transmission and reception of data. Moreover, the INF (information field) indicates data to be transmitted and received, and in the present embodiment, data in the INF (information field) corresponds to telegraph data. Moreover, the EDC (error detection code) is used for detecting a transmission error of the non-contact communication protocol.

Figure 6:
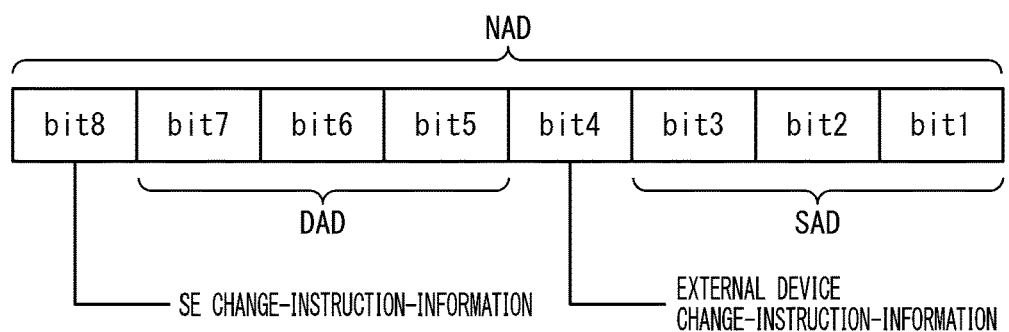
FIG. 6 is a diagram illustrating an example of node address information (NAD) according to the first embodiment.

The NAD is node address information and has such a bit structure as illustrated in FIG. 6.

FIG. 6 is a diagram illustrating an example of node address information (NAD) according to the present embodiment.

As illustrated in FIG. 6, the node address information (NAD) has such a structure that a transmission destination identifier (DAD) and SE change-instruction-information are set by the upper four bits, and a transmission source identifier (SAD) and external device change-instruction-information are set by the lower four bits. That is, the node address information (NAD) includes a transmission destination identifier for identifying a transmission destination, a transmission source identifier for identifying a transmission source, and change-instruction-information (SE change-instruction-information and external device change-instruction-information) giving instructions to change a transmission destination.

The SE change-instruction-information (an example of first change-instruction-information) is allocated to bit 8 (bit8) of the node address information (NAD), and, when the bit 8 is "1", the transmission destination SE 20 is changed to an SE 20 corresponding to the DAD (transmission destination identifier).

The external device change-instruction-information (an example of second change-instruction-information) is allocated to bit 4 (bit4) of the node address information (NAD), and when the bit 4 is "1", the transmission destination external device 50 is changed to an external device 50 corresponding to the DAD (transmission destination identifier).

The SAD (transmission source identifier) designates a node address of a transmission source using the three bits of bit 1 (bit1) to bit 3 (bit3).

Moreover, the DAD (transmission destination identifier) designates a node address of a transmission destination using the three bits of bit 5 (bit5) to bit 7 (bit7).

Returning again to FIG. 1, the communication processor 32 changes the transmission destination to an SE 20 corresponding to the transmission destination identifier (DAD) when the change-instruction-information included in the NAD indicates an instruction to change the transmission destination (for example, when the SE change-instruction-information is "1"). Here, the communication processor 32 receives the telegraph data to which the identifier included in the transmitted SE construction data (SE list information) is assigned as the DAD (transmission destination identifier) from the reader/writer device 40 and changes the transmission destination to an SE 20 corresponding to the DAD (transmission destination identifier) assigned to the telegraph data.

The communication processor 32 receives the device construction data (external device list information) from the reader/writer device 40 and stores the received device construction data (external device list information) in the device information storage 313. When changing the transmission destination external device 50, the communication processor 32 designates the external device 50 included in the device construction data stored in the device information storage 313 to the DAD of the node address information (NAD) and sets the external device change-instruction-information to "1". The communication processor 32 transmits the telegraph data to which the node address information (NAD) is assigned to the reader/writer device 40.

The coil 33 is used for non-contact communication between the communicator 30 and the reader/writer device 40. The coil 33 performs non-contact communication using electromagnetic induction between the coil 33 and a coil 43 included in the reader/writer device 40, for example.

The reader/writer device 40 communicates with the communicator 30 of the portable electronic device 10 using non-contact communication. The reader/writer device 40 transmits the data (telegraph data) received from the communicator 30 using non-contact communication to one of the plurality of external devices 50. Moreover, the reader/writer device 40 changes the transmission destination to an external device 50 corresponding to the transmission destination identifier (DAD) among the plurality of external devices 50 on the basis of the transmission destination identifier and the change-instruction-information assigned to the telegraph data received from the communicator 30 using non-contact communication, for example. The reader/writer device 40 transmits the telegraph data received from the communicator 30 to the changed external device 50.

The configuration of the telegraph block transmitted and received by the reader/writer device 40 is similar to the configuration illustrated in FIG. 5. Moreover, the configuration of the node address information (NAD) included in the telegraph block is similar to the configuration illustrated in FIG. 6.

Moreover, the reader/writer device 40 includes a storage 41, a communication processor 42, and a coil 43.

The storage 41 stores various pieces of information used for processing of the reader/writer device 40. The storage 41 includes a transmission destination setting storage 411, an SE information storage 412, and a device information storage 413.

The transmission destination setting storage 411 stores transmission destination setting information indicating an external device among the plurality of external devices 50 to which the data (telegraph data) received (acquired) from the communicator 30 will be transmitted. The transmission destination setting storage 411 stores the transmission destination identifier for identifying the external device 50 as the transmission destination setting information. The transmission destination setting storage 411 stores "4", for example, as the transmission destination identifier (node address) in an initial state (default), for example.

The SE information storage 412 stores the identifier corresponding to the SE 20 included in the portable electronic device 10 as the SE list information (secure element list information). Here, the SE list information is SE construction data, for example, and is received (acquired) from the communicator 30 of the portable electronic device 10. Moreover, the SE information storage 412 stores the SE list information similarly to the SE information storage 312 illustrated in FIG. 3, for example.

The device information storage 413 (an example of the external device information storage) stores the identifier corresponding to the external device 50 that can be connected to the reader/writer device 40 as the external device list information. Here, the external device list information is device construction data indicating the list of the external devices 50 that can be connected to the reader/writer device 40, for example. Moreover, the device information storage 413 stores the external device list information (device construction data) similarly to the device information storage 313 illustrated in FIG. 4, for example.

The communication processor 42 is a processor including a CPU and the like, for example, and controls the reader/writer device 40 integrally. The communication processor 42 processes proximity non-contact communication with the communicator 30 via the coil 43 to be described later. In the initial state, the communication processor 42 relays data communication between the external device 50-1 ("external device A") designated initially and the SE 20-1 ("SE_0") via the communicator 30. In the initial state, the communication processor 42 stores "4" in the transmission destination setting storage 411 as the transmission destination identifier (node address) corresponding to the external device 50-1 ("external device A"), for example.

The communication processor 42 transmits the device construction data (external device list information) stored in the device information storage 413 to the communicator 30. The communication processor 42 changes the transmission destination to an external device 50 corresponding to the transmission destination identifier among the plurality of external devices 50 on the basis of the transmission destination identifier and the change-instruction-information assigned to the telegraph data received from the communicator 30 using non-contact communication and transmits the telegraph data received from the communicator 30 to the external device 50.

Here, the telegraph of the non-contact communication between the reader/writer device 40 and the communicator 30 is similar to the telegraph block as illustrated in FIG. 5, for example.

The communication processor 42 changes the transmission destination to the external device 50 corresponding to the transmission destination identifier (DAD) when the change-instruction-information included in the NAD indicates an instruction to change the transmission destination (for example, when the external device change-instruction-information is "1"). Here, the communication processor 42 receives the telegraph data to which the identifier included in the transmitted device construction data (the external device list information) is assigned as the DAD (transmission destination identifier) from the communicator 30 and changes the transmission destination to an external device 50 corresponding to the DAD (transmission destination identifier) assigned to the telegraph data.

The communication processor 32 receives the SE construction data (SE list information) from the communicator 30 and stores the received SE construction data (SE list information) in the SE information storage 412. When changing the transmission destination SE 20, the communication processor 42 designates the SE 20 included in the SE construction data stored in the SE information storage 412 to the DAD of the node address information (NAD) and sets the SE change-instruction-information to "1". The communication processor 42 transmits the telegraph data to which the node address information (NAD) is assigned to the communicator 30.

The coil 43 is used for non-contact communication between the communicator 30 and the reader/writer device 40. The coil 43 performs non-contact communication using electromagnetic induction between the coil 43 and the coil 33 included in the communicator 30, for example.

Next, an operation of the non-contact communication system 1 according to the present embodiment will be described with reference to the drawings.

Figure 7:
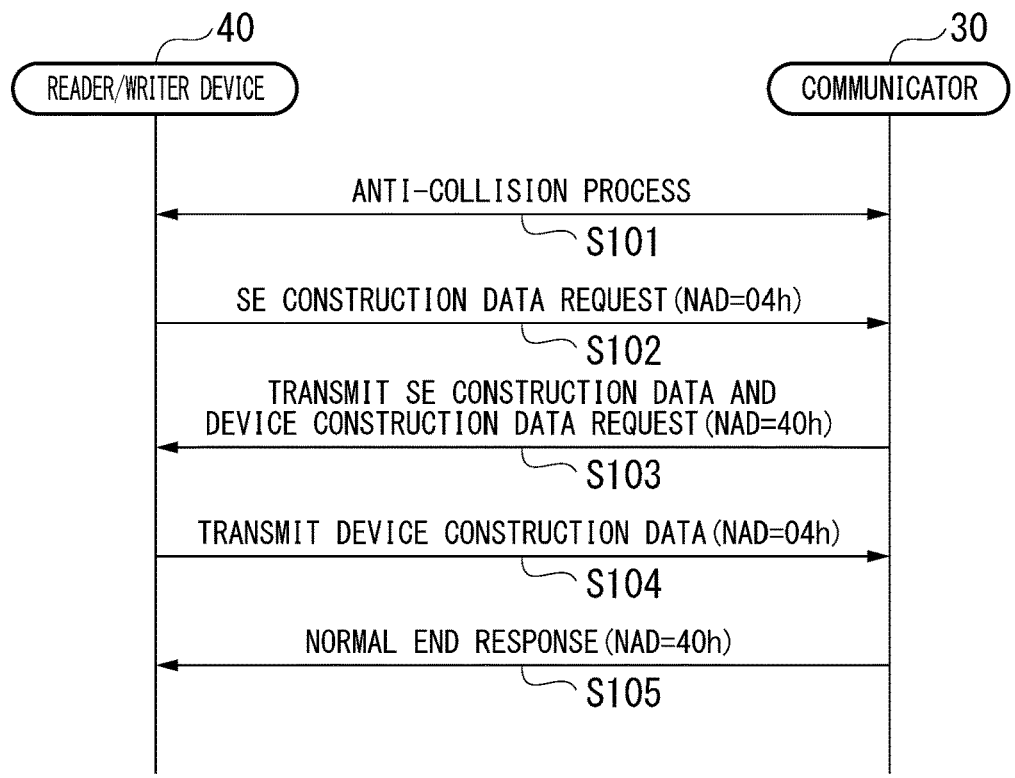
FIG. 7 is a diagram illustrating an example of a process of transferring SE construction data and device construction data according to the first embodiment.

FIG. 7 is a diagram illustrating an example of a process of transferring SE construction data and device construction data according to the present embodiment.

As illustrated in FIG. 7, first, the non-contact communication system 1 executes an anti-collision process between the reader/writer device 40 and the communicator 30 of the portable electronic device 10 when starting non-contact communication (step S101). Here, the anti-collision process is a process performed when starting communication and is a process of detecting one portable electronic device 10 from a plurality of portable electronic devices 10 and performing communication.

Subsequently, the reader/writer device 40 transmits an SE construction data request to the communicator 30 (step S102). The identifier corresponding to the external device 50 connected to the reader/writer device 40 in the initial state is "4", and the identifier corresponding to the SE 20 selected in the initial state is "0". Moreover, the identifier corresponding to the SE 20 selected in the initial state is "0". Therefore, the NAD assigned to the SE construction data request is "04h". Here, "h" in "xxh" indicates that it is a hexadecimal number.

In the initial state, the communication processor 42 of the reader/writer device 40 stores "4" in the transmission destination setting storage 411. Moreover, the communication processor 42 transmits the SE construction data request assigned with NAD (="04h") to the communicator 30 using non-contact communication.

Subsequently, the communicator 30 assigns NAD (="40h") to the SE construction data and the device construction data request and transmits the same to the reader/writer device 40 according to the SE construction data request (step S103) The communication processor 32 of the communicator 30 stores "0" in the transmission destination setting storage 311 in the initial state. Moreover, the communication processor 32 reads the SE construction data (SE list information) stored in the SE information storage 312 according to the received SE construction data request, assigns NAD (="40h") to the SE construction data and the device construction data request, and transmits the same to the reader/writer device 40.

Subsequently, the reader/writer device 40 assigns NAD (="04h") to the device construction data and transmits the same to the communicator 30 according to the device construction data request (step S104). That is, the communication processor 42 of the reader/writer device 40 stores the received SE construction data in the SE information storage 412. Moreover, the communication processor 42 reads the device construction data (external device list information) stored in the device information storage 413 according to the received device construction data request, assigns NAD (="04h") to the device construction data, and transmits the same to the communicator 30.

Subsequently, the communicator 30 transmits a normal end response assigned with NAD (="40h") to the reader/writer device 40 (step S105). That is, the communication processor 32 of the communicator 30 stores the received device construction data in the device information storage 313. The communication processor 32 transmits the normal end response assigned with NAD (="40h") to the reader/writer device 40. In this way, the non-contact communication system 1 ends the process of transferring the SE construction data and the device construction data.

Next, a transmission destination changing process according to the present embodiment will be described with reference to FIG. 8.

Figure 8:
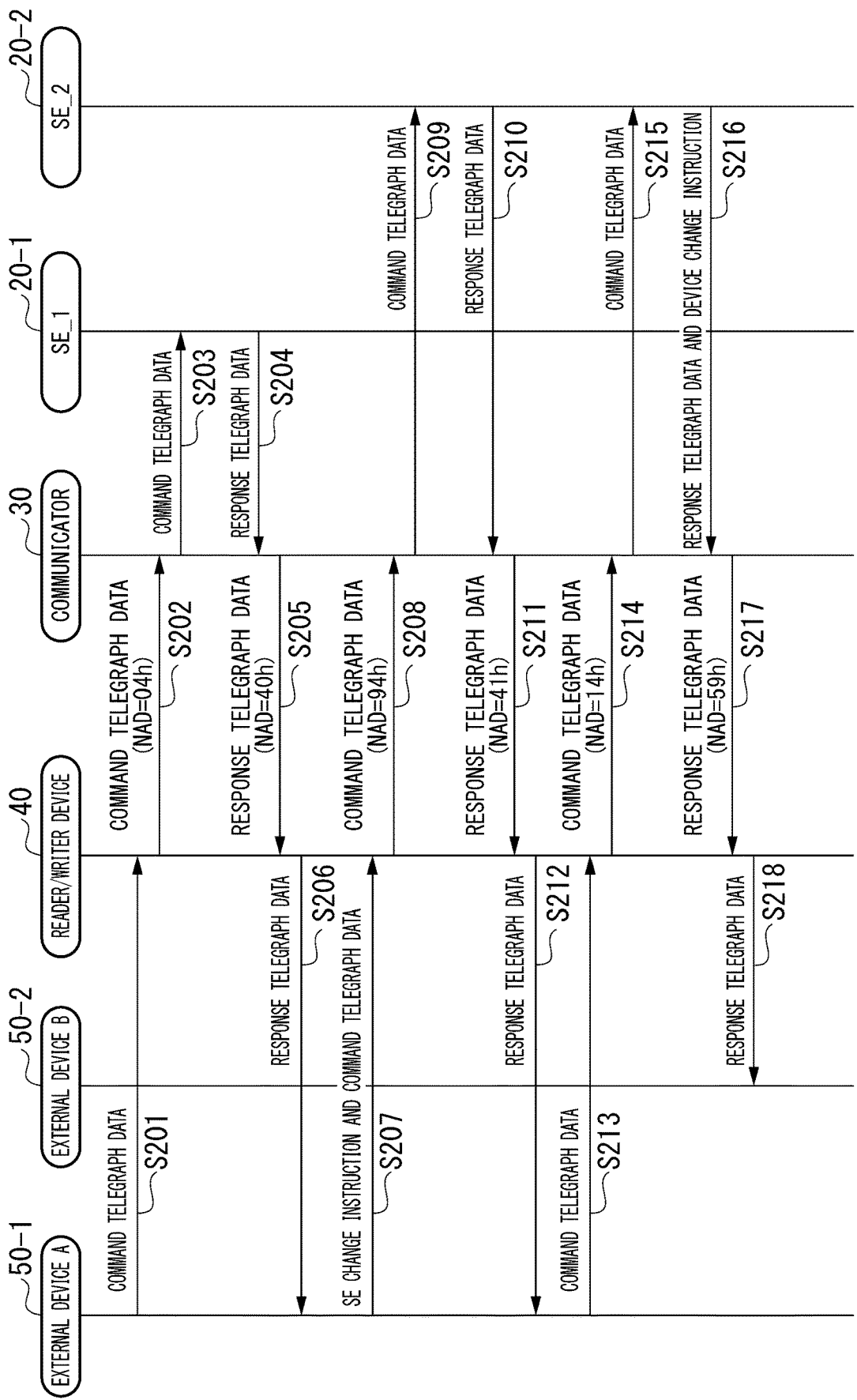
FIG. 8 is a diagram illustrating an example of a transmission destination changing process according to the first embodiment.

FIG. 8 is a diagram illustrating an example of a transmission destination changing process according to the present embodiment. In the example illustrated in FIG. 8, a process of changing the SE 20 from SE 20-1 ("SE_1") to SE 20-2 ("SE_2") and a process of changing the external device 50 from external device 50-1 ("external device A") to external device 50-2 ("external device B") will be described.

As illustrated in FIG. 8, first, the external device 50-1 transmits command telegraph data to the reader/writer device 40 (step S201).

Subsequently, the reader/writer device 40 transmits the command telegraph data assigned with NAD (="04h") to the communicator 30 (step S202). The communication processor 42 of the reader/writer device 40 assigns NAD (="04h") to the command telegraph data received from the external device 50-1 and transmits the command telegraph data to the communicator 30.

Subsequently, the communicator 30 transmits the command telegraph data to the SE 20-1 (step S203). The communication processor 32 of the communicator 30 transmits the command telegraph data received from the reader/writer device 40 to the SE 20-1 corresponding to the DAD of "0".

Subsequently, the SE 20-1 transmits response telegraph data to the communicator 30 (step S204). The SE 20-1 executes a command process corresponding to the command telegraph data received from the communicator 30 and transmits response telegraph data which is the result of the command process to the communicator 30.

Subsequently, the communicator 30 transmits the response telegraph data assigned with NAD (="40h") to the reader/writer device 40 (step S205). The communication processor 32 transmits the response telegraph data received from the SE 20-1 to the external device 50-1 corresponding to the DAD of "4".

Subsequently, the reader/writer device 40 transmits the response telegraph data to the external device 50-1 (step S206). The communication processor 42 transmits the response telegraph data received from the communicator 30 to the external device 50-1 corresponding to the DAD of "4".

Subsequently, the external device 50-1 transmits an SE change instruction and the command telegraph data to the reader/writer device 40 (step S207). Here, it is assumed that the SE change instruction is an instruction to change to SE 20-2 ("SE_2"), for example.

Subsequently, the reader/writer device 40 transmits the command telegraph data assigned with NAD (="94h") to the communicator 30 (step S208). The communication processor 42 assigns NAD (="94h") including "1" of the SE change-instruction-information, "1" of the DAD, "0" of the external device change-instruction-information, and "4" of the SAD to the command telegraph data received from the external device 50-1 and transmits the command telegraph data to the communicator 30.

Subsequently, the communicator 30 transmits the command telegraph data to the SE 20-2 (step S209). In this case, since the SE change-instruction-information is "1", the communication processor 32 changes the transmission destination to the SE 20-2 corresponding to "1" of the DAD and transmits the command telegraph data received from the reader/writer device 40 to the SE 20-2 corresponding to "1" of the DAD. In this way, the SE 20 is changed from SE 20-1 ("SE_1") to SE 20-2 ("SE_2").

Subsequently, the SE 20-2 transmits the response telegraph data to the communicator 30 (step S210). The SE 20-2 executes a command process corresponding to the command telegraph data received from the communicator 30 and transmits response telegraph data which is the result of the command process to the communicator 30.

Subsequently, the communicator 30 transmits response telegraph data assigned with NAD (="41h") to the reader/writer device 40 (step S211). The communication processor 32 transmits the response telegraph data received from the SE 20-2 to the external device 50-1 corresponding to the DAD of "4".

Subsequently, the reader/writer device 40 transmits the response telegraph data to the external device 50-1 (step S212). The communication processor 42 transmits the response telegraph data received from the communicator 30 to the external device 50-1 corresponding to the DAD of "4".

Subsequently, the external device 50-1 transmits the command telegraph data to the reader/writer device 40 (step S213).

Subsequently, the reader/writer device 40 transmits the command telegraph data assigned with NAD (="14h") to the communicator 30 (step S214). The communication processor 42 assigns NAD (="14h") to the command telegraph data received from the external device 50-1 and transmits the command telegraph data to the communicator 30.

Subsequently, the communicator 30 transmits the command telegraph data to the SE 20-2 (step S215). The communication processor 32 transmits the command telegraph data received from the reader/writer device 40 to the SE 20-2 corresponding to the DAD of "1".

Subsequently, the SE 20-2 transmits the response telegraph data and a device change instruction to the communicator 30 (step S216).

Subsequently, the communicator 30 transmits the response telegraph data assigned with NAD (="59h") to the reader/writer device 40 (step S217). The communication processor 32 assigns NAD (="59h") including "0" of the SE change-instruction-information, "5" of the DAD, "1" of the external device change-instruction-information, and "1" of the SAD to the command telegraph data received from the SE 20-2 and transmits the command telegraph data to the reader/writer device 40.

Subsequently, the reader/writer device 40 transmits the response telegraph data to the external device 50-2 (step S218). In this case, since the external device change-instruction-information is "1", the communication processor 42 changes the transmission destination to the external device 50-2 corresponding to the DAD of "5" and transmits the response telegraph data received from the communicator 30 to the external device 50-2 corresponding to the DAD of "5". In this way, the external device 50 is changed from external device 50-1 ("external device A") to external device 50-2 ("external device B").

As described above, the portable electronic device 10 of the present embodiment includes the plurality of SEs 20 (secure elements) and the communicator 30. The communicator 30 communicates with the reader/writer device 40 to which the external device 50 is connected using non-contact communication. Moreover, the communicator 30 changes the transmission destination to the SE 20 corresponding to the transmission destination identifier (DAD) for identifying the transmission destination among the plurality of SEs 20 on the basis of the transmission destination identifier (DAD) and the change-instruction-information (for example, the SE change-instruction-information) giving instructions to change the transmission destination, assigned to the telegraph data received from the reader/writer device 40 using non-contact communication. The communicator 30 transmits the telegraph data received from the reader/writer device 40 to the changed SE 20.

In this way, the portable electronic device 10 according to the present embodiment can change the SE 20 from the external device 50 (or the reader/writer device 40), for example, and can perform communication appropriately in order to be able to handle the plurality of SEs 20. The portable electronic device 10 according to the present embodiment can select one of the plurality of SEs 20 from the reader/writer device 40 according to an application and can perform communication when the portable electronic device 10 includes a plurality of SEs 20 such as a plurality of SIM cards, for example. Therefore, the portable electronic device 10 does not need to execute a process of switching between the plurality of SEs 20. Therefore, the portable electronic device 10 can improve the usability. Moreover, the portable electronic device 10 of the present embodiment can change the SE 20 flexibly in the middle of processing.

In the present embodiment, the telegraph data is assigned with the node address information (NAD) including the transmission destination identifier (DAD), the transmission source identifier (SAD) for identifying the transmission source, and the change-instruction-information (for example, the SE change-instruction-information). The communicator 30 changes the transmission destination to the SE 20 corresponding to the transmission destination identifier (DAD) when the change-instruction-information included in the node address information (NAD) indicates an instruction to change the transmission destination (for example, when the SE change-instruction-information is "1").

Due to this, the portable electronic device 10 according to the present embodiment can change the SE 20 using the node address information (NAD) of the telegraph block of a standardized non-contact communication protocol. Therefore, the portable electronic device 10 according to the present embodiment can perform communication appropriately in order to be able to handle a plurality of SEs 20 by a simple method while using the standardized non-contact communication protocol (while maintaining the compatibility with the standardized non-contact communication protocol).

The portable electronic device 10 according to the present embodiment includes the SE information storage 312 (a secure element information storage) that stores the identifier corresponding to the SE 20 included in the host device as the SE list information (SE construction data). The communicator 30 transmits the SE list information stored in the SE information storage 312 to the reader/writer device 40, receives the telegraph data assigned with the identifier included in the SE list information as the transmission destination identifier (DAD) from the reader/writer device 40, and changes the transmission destination to the SE 20 corresponding to the transmission destination identifier (DAD) assigned to the telegraph data.

In this way, since the portable electronic device 10 according to the present embodiment notifies the reader/writer device 40 (or the external device 50) of the mounting information of the plurality of SEs 20, the reader/writer device 40 (or the external device 50) can perform communication more appropriately in order to be able to handle the plurality of SEs 20.

The non-contact communication system 1 according to the present embodiment includes the portable electronic device 10, the plurality of external devices 50, and the reader/writer device 40. The reader/writer device 40 communicates with the communicator 30 using non-contact communication. The reader/writer device 40 changes the transmission destination to the external device 50 corresponding to the transmission destination identifier (DAD) among the plurality of external devices 50 on the basis of the transmission destination identifier (DAD) and the change-instruction-information (for example, the external device change-instruction-information) assigned to the telegraph data received from the communicator 30 using non-contact communication and transmits the telegraph data received from the communicator 30 to the external device 50.

In this way, the non-contact communication system 1 according to the present embodiment can change the external device 50 from the SE 20 (or the communicator 30) and can perform communication appropriately in order to be able to handle the plurality of external devices 50, for example. Since the non-contact communication system 1 according to the present embodiment can select one of the plurality of external devices 50 from the SE 20 (or the communicator 30) according to an application, for example, and can perform communication, the reader/writer device 40 does not need to execute a process of switching between the plurality of external devices 50, for example. Therefore, the non-contact communication system 1 according to the present embodiment can improve usability. Moreover, the non-contact communication system 1 according to the present embodiment can change the external device 50 flexibly in the middle of processing.

The non-contact communication system 1 according to the present embodiment includes the device information storage 413 that stores the identifier corresponding to the external device 50 that can be connected to the reader/writer device 40 as the external device list information. The reader/writer device 40 transmits the external device list information stored in the device information storage 413 to the communicator 30. The reader/writer device 40 receives the telegraph data assigned with the identifier included in the external device list information as the transmission destination identifier (DAD) from the communicator 30 and changes the transmission destination to the external device 50 corresponding to the transmission destination identifier (DAD) assigned to the telegraph data.

In this way, since the non-contact communication system 1 according to the present embodiment notifies the reader/writer device 40 (or the external device 50) of the mounting information of the plurality of SEs 20, the communicator 30 (or the SE 20) can perform communication more appropriately in order to be able to handle the plurality of external devices 50.

In the present embodiment, the telegraph data is assigned with the node address information (NAD) including the transmission destination identifier (DAD) and the transmission source identifier (SAD) for identifying the transmission source, the SE change-instruction-information (first change-instruction-information) giving instructions to change the transmission destination SE 20, and the external device change-instruction-information (second change-instruction-information) giving instructions to change the transmission destination external device 50. The communicator 30 changes the transmission destination to the SE 20 corresponding to the transmission destination identifier (DAD) when the SE change-instruction-information included in the node address information (NAD) indicates an instruction to change the transmission destination (for example, when the SE change-instruction-information is "1") Moreover, the reader/writer device 40 changes the transmission destination to the external device 50 corresponding to the transmission destination identifier (DAD) when the external device change-instruction-information included in the node address information (NAD) indicates an instruction to change the transmission destination (for example, when the external device change-instruction-information is "1").

In this way, the non-contact communication system 1 according to the present embodiment can perform communication while changing (switching) both the SE 20 and the external device 50 appropriately using a simple method that uses the node address information (NAD) of the telegraph block of the standardized non-contact communication protocol.

The non-contact communication method according to the present embodiment is a non-contact communication method between the reader/writer device 40 to which the external device 50 is connected and the portable electronic device 10 including a plurality of SEs 20, and includes a changing step and a transmitting step. In the changing step, the communicator 30 changes the transmission destination to the SE 20 corresponding to the transmission destination identifier (DAD) for identifying the transmission destination among the plurality of SEs 20 on the basis of the transmission destination identifier and the change-instruction-information (for example, SE change-instruction-information) giving instructions to change the transmission destination, assigned to the telegraph data received from the reader/writer device 40 using non-contact communication. In the transmitting step, the communicator 30 transmits the telegraph data received from the reader/writer device 40 to the SE 20 changed in the changing step.

In this way, the non-contact communication method according to the present embodiment provides advantages similar to those of the portable electronic device 10 and the non-contact communication system 1 and can perform communication appropriately in order to be able to handle a plurality of SEs 20.

Second Embodiment

Next, a non-contact communication system 1*a* according to a second embodiment will be described with reference to the drawings. In the present embodiment, an example of a case in which the SE 20-1 selected in the initial state includes the SE information storage 312 included in the communicator 30 in the first embodiment, and the external device 50-1 selected in the initial state includes the device information storage 413 included in the reader/writer device 40 will be described.

Figure 9:
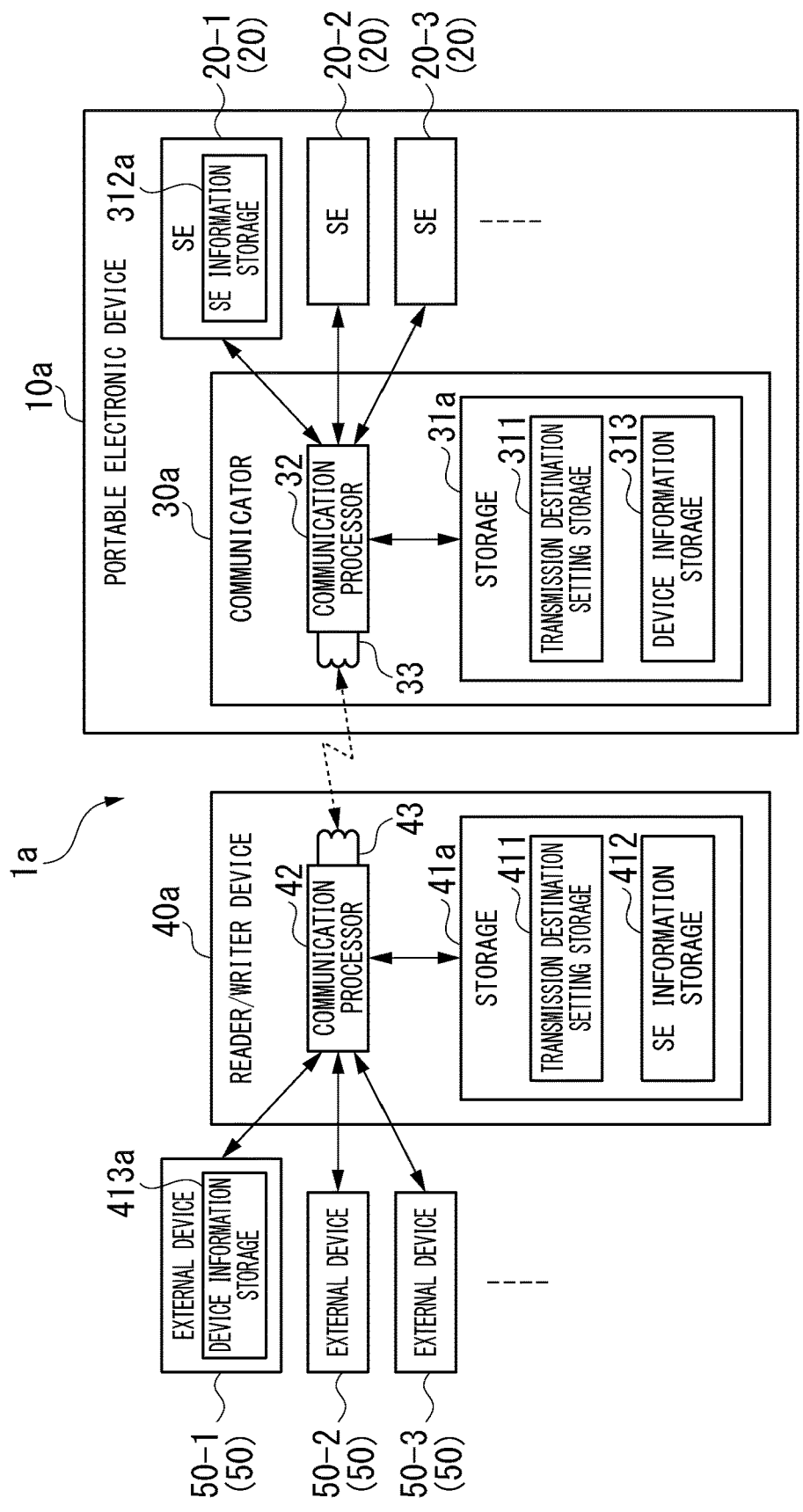
FIG. 9 is a block diagram illustrating an example of a non-contact communication system according to a second embodiment.

FIG. 9 is a block diagram illustrating an example of the non-contact communication system 1*a* according to the present embodiment.

As illustrated in FIG. 9, the non-contact communication system 1*a* includes a portable electronic device 10*a*, a reader/writer device 40*a*, and external devices (50-1, 50-2, 50-3, and the like).

In FIG. 9, the same components as those illustrated in FIG. 1 will be denoted by the same reference numerals and the description thereof will be omitted.

The portable electronic device 10*a* is a portable terminal such as a smartphone, for example, and includes a plurality of SEs 20 (20-1, 20-2, 20-3, and the like) and a communicator 30*a*. The portable electronic device 10*a* communicates with the reader/writer device 40*a* using proximity non-contact communication.

The communicator 30*a* has a basic configuration similar to that of the communicator 30 of the first embodiment and includes a storage 31*a*, a communication processor 32, and a coil 33.

The storage 31*a* includes the transmission destination setting storage 311 and the device information storage 313. Moreover, the SE 20-1 selected in the initial state (default) includes a SE information storage 312*a* The present embodiment is different from the first embodiment in that the storage 31*a* does not include the SE information storage 312, and the SE 20-1 includes an SE information storage 312*a* similar to the SE information storage 312.

When transmitting SE construction data (SE list information) to the reader/writer device 40a, the communicator 30a of the present embodiment reads the SE construction data (SE list information) from the SE information storage 312a and transmits the SE construction data to the reader/writer device 40a.

The reader/writer device 40a can be connected to the plurality of external devices 50 (50-1, 50-2, 50-3, and the like), and a basic configuration thereof is similar to that of the reader/writer device 40 of the first embodiment. The reader/writer device 40a includes a storage 41a, a communication processor 42, and a coil 43.

The storage 41a includes a transmission destination setting storage 411 and a SE information storage 412. Moreover, the external device 50-1 selected in the initial state (default) includes a device information storage 413a. The present embodiment is different from the first embodiment in that the storage 41a does not include the device information storage 413, and the external device 50-1 includes a device information storage 413a similar to the device information storage 413.

When transmitting device construction data (external device list information) to the communicator 30a, the reader/writer device 40a reads the device construction data (external device list information) from the device information storage 413a and transmits the device construction data to the communicator 30a.

Next, an operation of the non-contact communication system 1a according to the present embodiment will be described with reference to the drawings.

Figure 10:
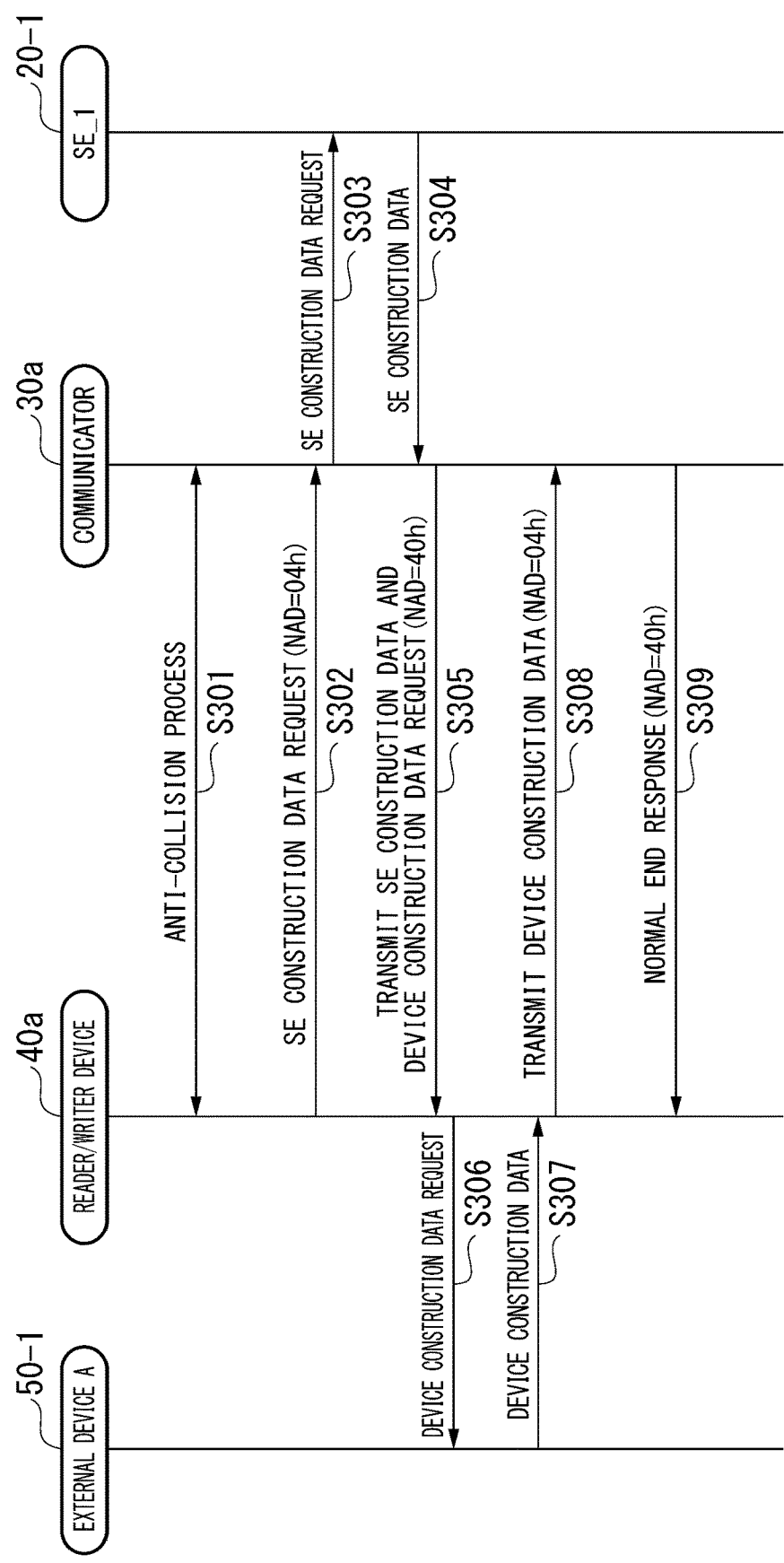
FIG. 10 is a diagram illustrating an example of a process of transferring SE construction data and device construction data according to the second embodiment.

FIG. 10 is a diagram illustrating an example of a process of transferring SE construction data and device construction data according to the present embodiment.

As illustrated in FIG. 10, first, the non-contact communication system 1a executes an anti-collision process between the reader/writer device 40a and the communicator 30a of the portable electronic device 10a when starting non-contact communication (step S301).

Subsequently, the reader/writer device 40a transmits a SE construction data request to the communicator 30a (step S302). In the initial state, the communication processor 42 of the reader/writer device 40a stores "4" in the transmission destination setting storage 411. Moreover, the communication processor 42 transmits the SE construction data request assigned with NAD (="04h") to the communicator 30a using non-contact communication.

Subsequently, the communicator 30a transmits a SE construction data request to the SE 20-1 according to the SE construction data request (step S303). The communication processor 32 of the communicator 30a transmits a command to read the SE construction data to the SE 20-1 as the SE construction data request.

Subsequently, the SE 20-1 transmits the SE construction data to the communicator 30a (step S304). The SE 20-1 reads the SE construction data from the SE information storage 312a according to the command to read the SE construction data and transmits the SE construction data to the communicator 30a as a response.

Subsequently, the communicator 30a assigns NAD (="40h") to the SE construction data and the device construction data request and transmits the same to the reader/writer device 40 (step S305). The communication processor 32 assigns NAD (="40h") to the device construction data request and the SE construction data read from the SE information storage 312a of the SE 20-1 and transmits the same to the reader/writer device 40a.

Subsequently, the reader/writer device 40a transmits the device construction data request to the external device 50-1 according to the device construction data request (step S306). The communication processor 42 of the reader/writer device 40a stores the received SE construction data in the SE information storage 412. Moreover, the communication processor 42 transmits a device construction data request to read device construction data to the external device 50-1 according to the received device construction data request.

Subsequently, the external device 50-1 transmits the device construction data to the reader/writer device 40a according to the device construction data request (step S307). The external device 50-1 reads the device construction data from the device information storage 413a and transmits the same to the reader/writer device 40a.

Subsequently, the reader/writer device 40a assigns NAD (="04h") to the device construction data read from the external device 50-1 and transmits the same to the communicator 30a (step S308).

Subsequently, the communicator 30a transmits a normal end response assigned with NAD (="40h") to the reader/writer device 40a (step S309). That is, the communication processor 32 stores the received device construction data in the device information storage 313. The communication processor 32 transmits a normal end response assigned with NAD (="40h") to the reader/writer device 40a. In this way, the non-contact communication system 1a ends the process of transferring the SE construction data and the device construction data.

Since the transmission destination changing process of the non-contact communication system 1a according to the present embodiment is similar to that of the first embodiment illustrated in FIG. 8, the description thereof will be omitted.

As described above, in the non-contact communication system 1a according to the present embodiment, the SE 20-1 selected in the initial state (default) includes the SE information storage 312a, and the communicator 30a transmits the SE construction data (SE list information) read from the SE information storage 312a of the SE 20-1 to the reader/writer device 40a. Moreover, the external device 50-1 selected in the initial state (default) includes the device information storage 413a, and the reader/writer device 40a transmits the device construction data (external device list information) read from the device information storage 413a of the external device 50-1 to the communicator 30a.

In this way, in the non-contact communication system 1a according to the present embodiment, since the SE construction data and the device construction data are exchanged between the communicator 30a and the reader/writer device 40a similarly to the first embodiment, it is possible to perform communication appropriately in order to be able to handle a plurality of SEs 20 and a plurality of external devices 50.

Third Embodiment

Next, a non-contact communication system 1 according to a third embodiment will be described with reference to the drawings. In the present embodiment, a modification when the SE change-instruction-information and the external device change-instruction-information included in the node address information (NAD) in the first embodiment are used in common will be described.

The configuration of the non-contact communication system 1 of the present embodiment is similar to that of the first embodiment illustrated in FIG. 1, and the description thereof will be omitted. In the present embodiment, in the node address information (NAD), the SE 20 and the external device 50 are changed according to transmission destination change-instruction-information indicating an instruction to change the transmission destination.

Figure 11:
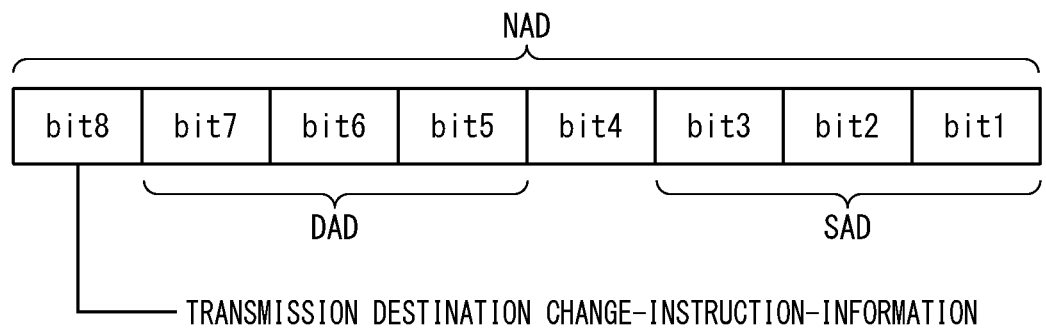
FIG. 11 is a diagram illustrating an example of node address information (NAD) according to a third embodiment.

FIG. 11 is a diagram illustrating an example of node address information (NAD) according to the present embodiment.

As illustrated in FIG. 11, the node address information (NAD) of the present embodiment has such a structure that a transmission destination identifier (DAD) and transmission destination change-instruction-information are set by the upper four bits, and a transmission source identifier (SAD) is set by the lower four bits. That is, the node address information (NAD) includes a transmission destination identifier for identifying a transmission destination, a transmission source identifier for identifying a transmission source, and transmission destination change-instruction-information giving instructions to change a transmission destination.

The transmission destination change-instruction-information is allocated to bit 8 (bit8) of the node address information (NAD), and when it is "1", the transmission destination is changed to the SE 20 or the external device 50 corresponding to the DAD (transmission destination identifier).

In the present embodiment, the communication processor 32 of the communicator 30 changes the transmission destination to the SE 20 corresponding to the transmission destination identifier (DAD) when the transmission destination change-instruction-information included in the NAD indicates an instruction to change the transmission destination (for example, when the transmission destination change-instruction-information is "1").

Moreover, the communication processor 42 of the reader/writer device 40 changes the transmission destination to the external device 50 corresponding to the transmission destination identifier (DAD) when the transmission destination change-instruction-information included in the NAD indicates an instruction to change the transmission destination (for example, when the transmission destination change-instruction-information is "1").

Next, an operation of the non-contact communication system 1 according to the present embodiment will be described with reference to the drawings.

The process of transferring SE construction data and device construction data according to the present embodiment is similar to that of the first embodiment illustrated in FIG. 7, and the description thereof will be omitted.

Figure 12:
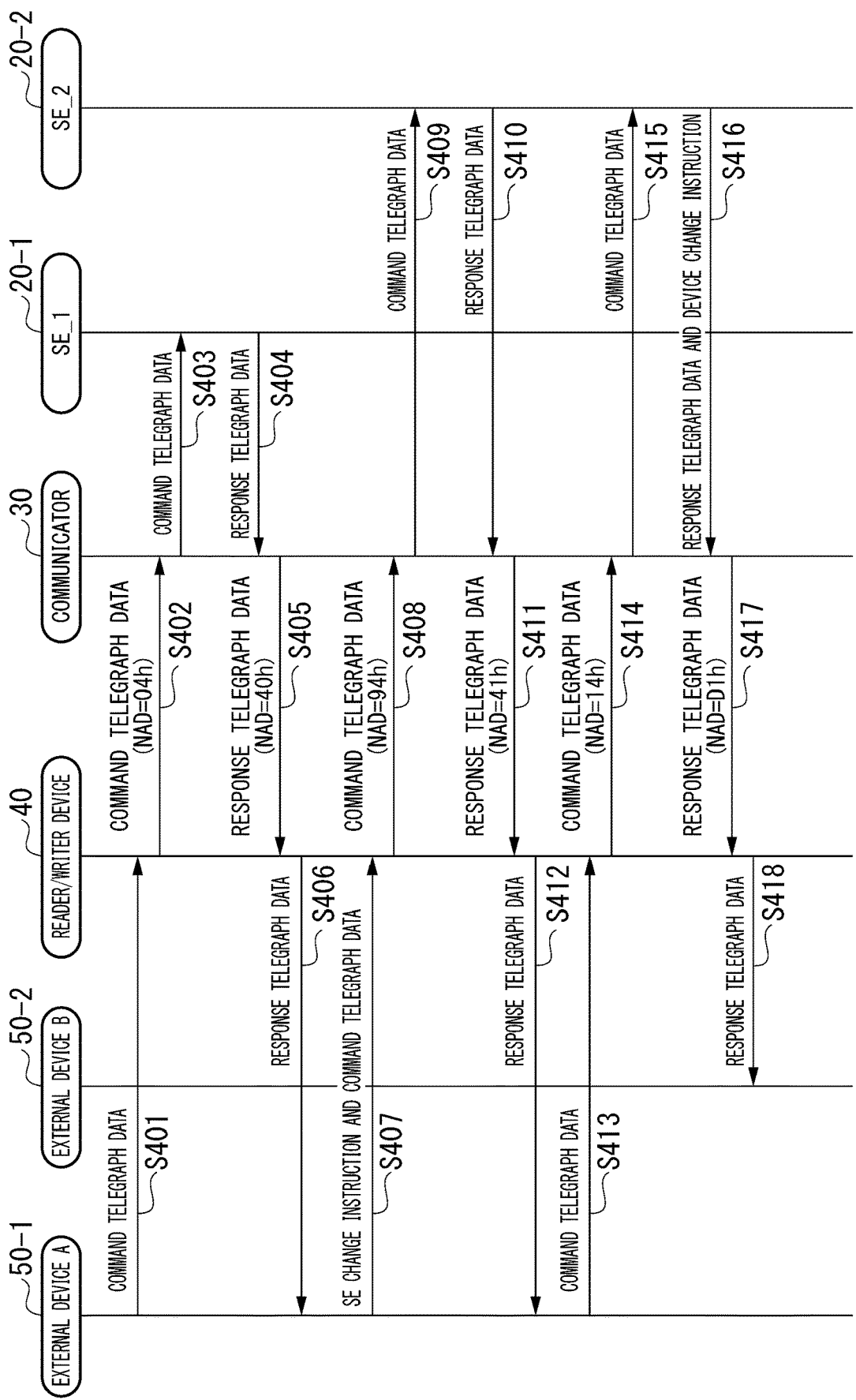
FIG. 12 is a diagram illustrating an example of a transmission destination changing process according to the third embodiment.

FIG. 12 is a diagram illustrating an example of a transmission destination changing process according to the present embodiment. In the example illustrated in FIG. 12, a process of changing the SE 20 from SE 20-1 ("SE_1") to SE 20-2 ("SE_2") and a process of changing the external device 50 from external device 50-1 ("external device A") to external device 50-2 ("external device B") will be described similarly to the example illustrated in FIG. 8.

In FIG. 12, the processes of steps S401 to S416 are similar to the processes of steps S201 to S216 illustrated in FIG. 8, and the description thereof will be omitted. In step S408, in NAD (="94h") assigned to the command telegraph data, "1" is set in the transmission destination change-instruction-information of bit 8.

In step S417, the communicator 30 transmits the response telegraph data assigned with NAD (="D1h") to the reader/writer device 40. The communication processor 32 assigns NAD (="D1h") including "1" of the transmission destination change-instruction-information, "5" of the DAD, and "1" of the SAD to the command telegraph data received from the SE 20-2 and transmits the same to the reader/writer device 40.

Subsequently, the reader/writer device 40 transmits the response telegraph data to the external device 50-2 (step S418) In this case, since the transmission destination change-instruction-information is "1", the communication processor 42 changes the transmission destination to the external device 50-2 corresponding to the DAD of "5" and transmits the response telegraph data received from the communicator 30 to the external device 50-2 corresponding to the DAD of "5". In this way, the external device 50 is changed from the external device 50-1 ("external device A") to the external device 50-2 ("external device B").

As described above, in the non-contact communication system 1 according to the present embodiment, the node address information (NAD) includes the transmission destination identifier (DAD) for identifying the transmission destination, the transmission source identifier (SAD) for identifying the transmission source, and the transmission destination change-instruction-information giving instructions to change the transmission destination. The communicator 30 changes the transmission destination to the SE 20 corresponding to the transmission destination identifier (DAD) when the transmission destination change-instruction-information included in the node address information (NAD) indicates an instruction to change the transmission destination (for example, when the transmission destination change-instruction-information is "1"). Moreover, the communication processor 42 of the reader/writer device 40 changes the transmission destination to the external device 50 corresponding to the transmission destination identifier (DAD) when the transmission destination change-instruction-information included in the node address information (NAD) indicates an instruction to change the transmission destination (for example, when the transmission destination change-instruction-information is "1").

In this way, the non-contact communication system 1 according to the present embodiment can perform communication while changing (switching) both the SE 20 and the external device 50 appropriately using a simple method that uses the node address information (NAD) of the telegraph block of the standardized non-contact communication protocol similarly to the first embodiment.

In the respective embodiments, although an example in which the communicator 30 (30*a*) includes the storage 31 (31*a*) has been described, parts or all of the storage 31 (31*a*) may be provided outside the communicator 30 (30*a*). Moreover, although an example in which the reader/writer device 40 (40*a*) includes the storage 41 (41*a*) has been described, parts or all of the storage 41 (41*a*) may be provided outside the reader/writer device 40 (40*a*).

In the respective embodiments, although an example in which the node address of the SE 20 and the node address of the external device 50 are set so as not to overlap has been described, the node address of the SE 20 may overlap the node address of the external device 50.

In the respective embodiments, although an example in which when changing the SE 20 or the external device 50, information indicating a change instruction is designated in the change-instruction-information whenever it is necessary has been described, there is no limitation thereto. The non-contact communication system 1 (1*a*) may set information indicating a change instruction in the change-instruction-information when changing the transmission destination at the first time and may change the transmission destination using the transmission destination identifier (DAD) without setting the change-instruction-information in the second and subsequent times.

In the respective embodiments, although an example in which the SE 20 is a SIM card has been described, there is no limitation thereto, and the SE 20 may be an IC module or the like.

In the respective embodiments, although an example in which the portable electronic device 10 (10*a*) is a portable terminal such as a smartphone has been described, there is no limitation thereto, and the portable electronic device 10 (10*a*) may be a personal digital assistant (PDA) or a non-contact IC card including a plurality of secure elements, for example.

In the third embodiment, although an example in which the transmission destination change-instruction-information is allocated to bit 8 (bit8) of the node address information (NAD) has been described, the transmission destination change-instruction-information may be allocated to bit 4 (bit4) of the node address information (NAD).

In the third embodiment, although an example in which the transmission destination change-instruction-information is allocated to bit 8 (bit8) of the node address information (NAD) in the first embodiment has been described, there is no limitation thereto, and the same may be applied to the second embodiment.

According to at least one of the embodiments, the portable electronic device includes the plurality of SEs 20 and the communicator 30 that changes the transmission destination to the SE 20 corresponding to the transmission destination identifier (DAD) for identifying the transmission destination among the plurality of SEs 20 on the basis of the transmission destination identifier (DAD) and the SE change-instruction-information giving instructions to change the transmission destination, assigned to the telegraph data received from the reader/writer device 40 using non-contact communication and transmits the telegraph data received from the reader/writer device 40 to the SE 20. In this way, it is possible to perform communication appropriately in order to be able to handle the plurality of SEs 20.

The embodiments can be expressed as follows.

A portable electronic device including:

a plurality of secure elements;

a storage that stores information; and a hardware processor that executes a program stored in the storage, wherein the storage stores the program for causing the hardware processor to execute:

a process of causing a communicator that performs communication with a reader/writer device to which an external device is connected using non-contact communication to change a transmission destination to a secure element corresponding to a transmission destination identifier for identifying the transmission destination among the plurality of secure elements on the basis of the transmission destination identifier and change-instruction-information giving instructions to change the transmission destination, assigned to telegraph data received from the reader/writer device using non-contact communication and transmit the telegraph data received from the reader/writer device to the secure element.

Each configuration included in the non-contact communication system 1 (1*a*) described above includes an internal computer system. The processes of each configuration included in the non-contact communication system 1 (1*a*) described above may be performed by recording a program for realizing the function of each configuration included in the non-contact communication system 1 (1*a*) described above on a computer-readable recording medium and causing a computer system to read and execute the program recorded on this recording medium. Here, "causing the computer system to read and execute the program recorded on the recording medium" includes installing the program in the computer system. The "computer system" described herein includes an OS and hardware such as peripheral devices.

The "computer system" may include a plurality of computer apparatuses connected via a network including the Internet, a WAN, a LAN or a communication line such as a dedicated line. Moreover, the "computer-readable recording medium" means a portable medium such as a flexible disc, a magneto-optical disk, a ROM, or a CD-ROM or a storage device such as a hard disk built in the computer system. In this way, the recording medium in which the program is stored may be a non-transient recording medium such as a CD-ROM.

The recording medium includes a recording medium installed inside or outside that is accessible from a distribution server to distribute the program. The program may be divided into a plurality of parts, and the parts may be downloaded at different timings and be combined by each configuration included in the non-contact communication system 1 (1*a*), and distribution servers distributing the divided programs may be different from each other. Furthermore, the "computer-readable recording medium" includes a medium storing the program for a predetermined period of time such as a volatile memory (RAM) inside a computer system serving as a server or a client in a case in which the program is transmitted via a network. The program may be a program used for realizing part of the function described above. Furthermore, the program may be a so-called a differential file (differential program) which can realize the function described above in combination with a program that has already been recorded in the computer system.

While certain embodiments of the present invention have been described, these embodiments have been presented by way of example only, and are not intended to limit the scope of the invention. These embodiments may be embodied in a variety of other forms, and various omissions, substitutions, and changes can be made without departing from the spirit of the invention. These embodiments and modifications thereof fall within the scope and spirit of the inventions and the inventions described in the claims and the equivalents thereof.

Part or all of the functions described above may be realized as an integrated circuit such as a large scale integration (LSI) or the like. Each function described above may be individually configured as a processor, and part or all of the functions may be integrated and configured as a processor. Moreover, a technique for realizing the integrated circuit is not limited to the LSI, and each function may be realized as a dedicated circuit or a general-purpose processor. Furthermore, when a technology of realizing an integrated circuit which replaces the LSI emerges in accordance with the progress of semiconductor technologies, an integrated circuit using such a technology may be used.

What is claimed is:

1. A portable electronic device comprising:

a plurality of secure elements; and a communicator that performs communication with a reader/writer device to which an external device is connected using non-contact communication, the communicator that changes a transmission destination to a secure element corresponding to a transmission destination identifier for identifying the transmission destination among the plurality of secure elements on the basis of the transmission destination identifier and of a change-instruction-information giving instructions to change the transmission destination, wherein the transmission destination identifier and the change-instruction-information are assigned to telegraph data received from the reader/writer device using the non-contact communication, and the communicator that transmits the telegraph data received from the reader/writer device to the secure element.

2. The portable electronic device according to claim 1, wherein the telegraph data is assigned with node address information including the transmission destination identifier, a transmission source identifier for identifying a transmission source, and the change-instruction-information, and the communicator changes the transmission destination to a secure element corresponding to the transmission destination identifier when the change-instruction-information included in the node address information indicates an instruction to change the transmission destination.

3. The portable electronic device according to claim 1, further comprising:

a secure element information storage that stores an identifier corresponding to the secure element included in a host device as secure element list information, wherein the communicator transmits the secure element list information stored in the secure element information storage to the reader/writer device, receives the telegraph data assigned with the identifier included in the secure element list information as the transmission destination identifier from the reader/writer device, and changes the transmission destination to the secure element corresponding to the transmission destination identifier assigned to the telegraph data.

4. A non-contact communication system comprising:
a plurality of secure elements;
a plurality of external devices; and
a communicator that performs communication with a reader/writer device to which the external device is connected using non-contact communication, wherein the communicator changes a transmission destination to a secure element corresponding to a transmission destination identifier for identifying the transmission destination among the plurality of secure elements on the basis of the transmission destination identifier and of a change-instruction-information giving instructions to change the transmission destination, wherein the transmission destination identifier and the change-instruction-information are assigned to telegraph data received from the reader/writer device using the non-contact communication, and wherein the communicator that transmits the telegraph data received from the reader/writer device to the secure element.

5. The non-contact communication system according to claim 4, further comprising:

an external device information storage that stores an identifier corresponding to the external device which can be connected to the reader/writer device as external device list information, wherein the reader/writer device transmits the external device list information stored in the external device information storage to the communicator, wherein the reader/writer device receives the telegraph data assigned with the identifier included in the external device list information as the transmission destination identifier from the communicator, and wherein the reader/writer device changes the transmission destination to an external device corresponding to the transmission destination identifier assigned to the telegraph data.

6. The non-contact communication system according to claim 4, wherein the telegraph data is assigned with node address information including the transmission destination identifier, a transmission source identifier for identifying a transmission source, first change-instruction-information giving instructions to change the transmission destination secure element, and second change-instruction-information giving instructions to change the transmission destination external device, the communicator changes the transmission destination to the secure element corresponding to the transmission destination identifier when the first change-instruction-information included in the node address information indicates an instruction to change the transmission destination, and the reader/writer device changes the transmission destination to the external device corresponding to the transmission destination identifier when the second change-instruction-information included in the node address information indicates an instruction to change the transmission destination.

7. A non-contact communication method between a reader/writer device to which an external device is connected and a portable electronic device including a plurality of secure elements, the method comprising:

allowing a communicator to change a transmission destination to a secure element corresponding to a transmission destination identifier for identifying a transmission destination among the plurality of secure elements on the basis of the transmission destination identifier and change-instruction-information giving instructions to change the transmission destination, assigned to telegraph data received from the reader/writer device using non-contact communication; and allowing the communicator to transmit the telegraph data received from the reader/writer device to the secure element changed.

* * * * *